United States Patent
Frolov et al.

(10) Patent No.: US 10,066,583 B2
(45) Date of Patent: Sep. 4, 2018

(54) CRYOGENIC FUEL SUPPLY SYSTEM FOR ENGINE

(71) Applicant: OPEN JOINT STOCK COMPANY "RUSSIAN RAILWAYS", Moscow (RU)

(72) Inventors: Boris Mikhailovich Frolov, Moscow region (RU); Valeriy Alekseevich Nikonov, Moscow region (RU); Andrei Gennadievich Voronkov, Moscow region (RU); Olga Vladimirovna Bychkova, Moscow region (RU); Maksim Viktorovich Kolosov, Moscow region (RU)

(73) Assignee: OPEN JOINT STOCK COMPANY "RUSSIAN RAILWAYS", Moscow (RU)

( * ) Notice: Subject to any disclaimer, the term of this patent is extended or adjusted under 35 U.S.C. 154(b) by 0 days.

(21) Appl. No.: 15/356,376

(22) Filed: Nov. 18, 2016

(65) Prior Publication Data
US 2017/0356390 A1 Dec. 14, 2017

(51) Int. Cl.
*F02M 21/02* (2006.01)
*B61C 17/00* (2006.01)
(Continued)

(52) U.S. Cl.
CPC ........... *F02M 21/0218* (2013.01); *B61C 5/00* (2013.01); *B61C 17/00* (2013.01); *B61C 17/02* (2013.01);
(Continued)

(58) Field of Classification Search
CPC ........... F02M 21/0239; F02M 21/0287; F02M 21/00; F02M 21/0209; F02M 21/0212;
(Continued)

(56) References Cited

U.S. PATENT DOCUMENTS

| 2014/0123947 A1* | 5/2014 | Song | F02M 39/00 123/446 |
| 2014/0130522 A1* | 5/2014 | Steffen | F17C 9/02 62/48.1 |
| 2014/0299101 A1* | 10/2014 | Melanson | F17C 5/06 123/445 |

FOREIGN PATENT DOCUMENTS

RU  2427724 C1  8/2011

* cited by examiner

*Primary Examiner* — Joseph Dallo
*Assistant Examiner* — Scott A Reinbold
(74) *Attorney, Agent, or Firm* — Andrew W. Chu; Craft Chu PLLC

(57) ABSTRACT

The cryogenic fuel supply system for an engine is arranged in locomotive two sections connected by an inter-section connection for the purpose of transferring fuel from one section to the other. There is a cryogenic reservoir for storage of a liquefied cryogenic fuel, a positive-displacement high-pressure cryogenic pump, an oil heat-exchanger, a gas heat-exchanger, a gas mixer, a gas receiver, a fuel filter, a controlled gas metering unit, pipelines, valves, controlled valves, and a control unit. The cryogenic fuel supply system further includes an intermediate buffer arranged between the cryogenic reservoir and the positive-displacement high-pressure pump and connected to the cryogenic reservoir by pipelines and to the positive-displacement high-pressure cryogenic pump by a pipeline and two additional pipelines. The additional pipeline is used both for discharging excess cryogenic fuel from the pump to the intermediate buffer and for maintaining a required pressure in the intermediate buffer and the cryogenic reservoir.

1 Claim, 1 Drawing Sheet

(51) Int. Cl.
    *B61C 5/00* (2006.01)
    *F02C 3/22* (2006.01)
    *B61C 17/02* (2006.01)
    *F02C 6/20* (2006.01)

(52) U.S. Cl.
    CPC ................. *F02C 3/22* (2013.01); *F02C 6/20* (2013.01); *F02M 21/0224* (2013.01); *F02M 21/0239* (2013.01); *F02M 21/0287* (2013.01); *Y02T 10/32* (2013.01)

(58) Field of Classification Search
    CPC ........... F02M 21/0221; F02M 21/0245; F02M 21/04; F02M 21/023–21/0242; F02M 21/0218–21/0224; B61C 17/00; B61C 5/00; B61C 17/02; F02C 3/22; F02C 6/20; Y02T 10/32; F17C 5/06
    USPC ....................................................... 123/526
    See application file for complete search history.

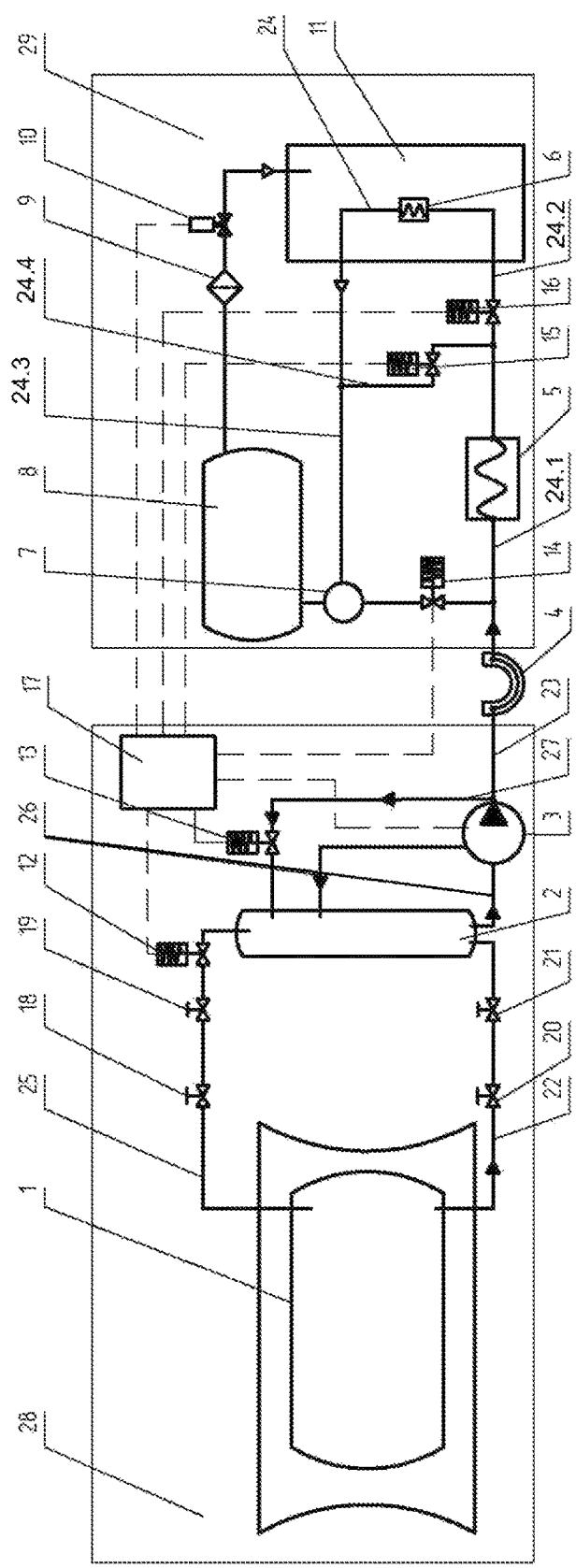

CRYOGENIC FUEL SUPPLY SYSTEM FOR ENGINE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to fuel supply systems for engines, in particular those using a gas fuel, and may be used in a cryogenic fuel supply system of a gas-turbine locomotive or a gas-diesel locomotive.

2. Description of Related Art Including Information Disclosed Under 37 CFR 1.97 and 37 CFR 1.98

A cryogenic fuel supply system for an engine is known in the art, which is taken as the prototype, comprising a cryogenic reservoir connected to the engine gas nozzles via a cryogenic pump, a fuel filter, an oil heat-exchanger and a gas heat-exchanger, a return gas pipeline for cooling the system units, valves and a control unit. A controlled positive-displacement high-pressure cryogenic pump is used as the cryogenic pump. The system is provided with a controlled throttle, a gas mixer, a gas receiver, a controlled gas metering unit. The cryogenic reservoir is connected to the engine gas nozzles via the cryogenic pump, the oil heat-exchanger, the gas heat-exchanger, the gas mixer, the gas receiver, the fuel filter and the controlled gas metering unit. The controlled throttle is connected in parallel to the inlets of the gas mixer and the oil heat-exchanger. The return pipeline is connected to the cryogenic pump and to the cryogenic reservoir. The cryogenic pump outlet is connected to the cryogenic reservoir by an additional pipeline provided with a controlled valve for discharging excess cryogenic fuel. An additional pipeline is arranged between the cryogenic reservoir and the outlet of the fuel filter for the purpose of maintaining constant pressure in the reservoir (Patent RU 2427724, IPC F02M 21/02, publ. Aug. 27, 2011).

Drawbacks of this cryogenic fuel supply system are: complexity of the pipeline system, long time required for preparation of the system for supplying of a cryogenic fuel for operation, insufficient reliability of the system.

BRIEF SUMMARY OF THE INVENTION

The technical effect of the invention consists in optimal arrangement of the pipelines used for cryogenic fuel supply, reduced time necessary for preparing the cryogenic fuel supply system for operation and transferring it to the "storage" mode, improved operation reliability of the cryogenic fuel supply system, reduced time required for maintenance and repair of a locomotive.

This technical effect is achieved due to providing the cryogenic fuel supply system, which is arranged in the locomotive two sections and comprises a cryogenic reservoir for a liquefied cryogenic fuel, a positive-displacement high-pressure cryogenic pump, an oil heat-exchanger, a gas heat-exchanger, a gas mixer, a gas receiver, a fuel filter, a controlled gas metering unit, pipelines, shutoff valves, controlled valves, a control unit, with an intermediate buffer installed between the cryogenic reservoir and the positive-displacement high-pressure cryogenic pump, the buffer being connected to the cryogenic reservoir by pipelines and to the positive-displacement high-pressure cryogenic pump by a pipeline and two additional pipelines, a pipeline, as connected to the inlets of the oil heat-exchanger, the gas heat-exchanger and the gas mixer, is additionally provided with controlled valves for the purpose of more accurate and reliable adjusting fuel supply to the gas receiver, and the cryogenic fuel supply pipeline is additionally provided with an inter-section connection means for transferring fuel from one section to the other.

The technical effect is further achieved by arranging the intermediate buffer at a minimal distance from the cryogenic reservoir and the positive-displacement high-pressure cryogenic pump, and the additional pipeline, which is arranged between the outlet of the positive-displacement high-pressure cryogenic pump and the intermediate buffer, is used both for discharging excess cryogenic fuel from the pump to the intermediate buffer and for maintaining a required pressure in the intermediate buffer and the cryogenic reservoir.

BRIEF DESCRIPTION OF THE SEVERAL VIEWS OF THE DRAWINGS

The FIGURE shows the functional layout of the proposed cryogenic fuel supply system for an engine.

DETAILED DESCRIPTION OF THE INVENTION

The cryogenic fuel supply system for an engine is arranged in the locomotive two sections 28, 29 (a first section 28 and a second section 29) connected by the inter-section connection means 4 and comprises: the cryogenic reservoir 1 for a liquefied cryogenic fuel; the intermediate buffer or buffer reservoir 2 serving for trouble-free operation of the positive-displacement high-pressure cryogenic pump 3 (hereinafter "the pump"); the pump 3 for adjusting and supplying a fuel to an engine 11; the oil heat-exchanger 5; the gas heat-exchanger 6; the gas mixer 7; the gas receiver 8; the fuel filter 9; the controlled gas metering unit 10; the engine 11; the controlled valves (first controlled valve 12, second controlled valve 13, third controlled valve 14, fourth controlled valve 15, and fifth controlled valve 161; the control unit 17; the valves (first valve 18, second valve 19, third valve 20, and fourth valve 211 connected by the pipelines (first pipeline 22, second pipeline 25, third pipeline 24.1, fourth pipeline 24.4, fifth pipeline 24.3, sixth pipeline 24.2, and a seventh pipeline 23) therebetween; the first additional pipeline 26 connecting the cold end of the pump 3 with the intermediate buffer or buffer reservoir 2, the second additional pipeline 27 connecting the outlet of the pump 3 with the intermediate buffer or buffer reservoir 2.

The cryogenic fuel supply system for an engine can be operated as follows.

The cryogenic fuel supply system operates under the control of the control unit 17 through which the pump 3, the controlled valves 12, 13, 14, 15, 16 and the controlled gas metering unit 10 are controlled.

A cryogenic fuel from the cryogenic reservoir 1, before the pump 3 is started, ensuring fuel adjustment and supply to the engine 11, is fed for cooling the intermediate buffer 2, the pipeline 22, the additional pipeline 26 and the pump 3, the valves 18, 19, 20, 21 being open and the controlled valve 12 being open, the other controlled valves being set at the "closed" position.

After the cryogenic fuel supply system is cooled, pressure is equalized in the cryogenic reservoir 1, the intermediate buffer 2, the gas receiver 8, the controlled valves 12 and 14 being open. The gas receiver 8 should have a certain volume and serves for providing a required fuel reserve if the operation mode of the engine 11 is changed, which improves operation reliability of the engine 11.

After pressure is equalized, the cryogenic pump 3 is started, and the engine 11 starts working after a preset pressure level is achieved in the gas receiver 8.

The use of the intermediate buffer 2, as arranged in the cryogenic fuel supply system, improves the performance of the pump 3 and reduces the risk of damage of the pump 3 due to discharge of gas bubbles forming in the pipeline 22 to the gas fraction in the intermediate buffer 2, as well as enables to make the cryogenic reservoir 1 removable, which provides the possibility of performing repairs and maintenance of a locomotive in the depot conditions without the necessity to drain and degas fuel from the cryogenic buffer 1, thus reducing time required for repairs and maintenance of a locomotive. The intermediate buffer 2 is arranged at a minimum distance from the pump 3 and the cryogenic reservoir 1, the pipelines 22 and 26 having a minimum length, which reduces time required for cooling and reduces consumption of a cryogenic fuel required for cooling.

When the operation mode of a locomotive is changed, an amount of a cryogenic fuel supplied to the engine 11, depending on power consumption of the engine 11, is changed by signals sent by the control unit 17 for changing rpm of the pump 3, the gas supply being finely metered by the controlled gas metering unit 10 and the controlled valves 14, 15, 16.

The controlled valves 14, 15, 16 are installed on the pipeline 24 going to the inlets of the oil heat-exchanger 5, the gas heat-exchanger 6 and the gas mixer 7, which valves ensure reliable bypass of a cryogenic fuel into the gas mixer 7 that maintains a preset fuel temperature, which further improves operation reliability of the fuel supply system for the engine 11.

The additional pipeline 26 with the controlled valve 13 is connected to the pump 3 and the intermediate buffer 2 and serves both for bypassing excess fuel when the engine 11 runs idle with the controlled valve 13 open, and for equalizing pressure between the cryogenic reservoir 1, the intermediate buffer 2 and the gas receiver 8 by compressed gas from the gas receiver 8 if pressure in the cryogenic reservoir drops below an allowable level when the controlled valves 12, 13, 14 are open and the pump 3 is not operated.

In order to ensure trouble-free operation of the cryogenic fuel supply system, the pipeline 23 is provided with the inter-section connection means 4 that is intended for supplying a cryogenic fuel from one section of a locomotive to the other.

After the engine 11 is stopped for speeding up the system transfer to the "storage" mode, gas from the gas receiver 8 is used.

The proposed cryogenic fuel supply system ensures stable operation of the engine 11 on liquefied natural gas and enables to reduce time required for preparing the cryogenic fuel supply system for operation and time required for its transfer to the "storage" mode.

We claim:

1. A cryogenic fuel supply system for an engine, being arranged in two sections of a locomotive and comprising:
   a cryogenic reservoir for storage of liquefied cryogenic fuel, being housed in a first section of said locomotive;
   a buffer reservoir being housed in said first section of said locomotive and being connected in parallel with said cryogenic reservoir by a first pipeline with a third valve and a fourth valve and by a second pipeline with a first valve, a second valve, and a first controlled valve;
   a positive-displacement high-pressure cryogenic pump, having a pump input and a pump output and being housed in a first section of said locomotive, said pump input being connected to said buffer reservoir by a first additional pipeline, said pump output being connected to said buffer reservoir by a second additional pipeline with a second controlled valve;
   a control unit being housed in a first section of said locomotive and being in communication with said first controlled valve and said second controlled valve;
   an oil heat-exchanger, being housed in a second section of said locomotive and having a heat-exchanger input and a heat-exchanger output, said heat-exchanger input being connected to a gas mixer by a third pipeline with a third controlled valve, said heat-exchanger output being connected to said gas mixer by a fourth pipeline with a fourth controlled valve and a fifth pipeline;
   a gas heat-exchanger being housed in said second section of said locomotive and being connected to said heat-exchanger output by a sixth pipeline with a fifth controlled valve, said gas heat-exchanger being connected to said gas mixer by said fifth pipeline;
   a gas receiver being housed in said second section of said locomotive and being connected to said gas mixer and an engine via a fuel filter and a controlled gas metering unit; and
   an inter-section connection means between said first section and said second section, said pump output being connected by a seventh pipeline to said third pipeline in said second section,
   wherein said control unit is in communication with said third controlled valve, said fourth controlled valve, said fifth controlled valve, said cryogenic pump, and said controlled gas metering unit.

* * * * *